Patented Jan. 14, 1930

1,743,433

UNITED STATES PATENT OFFICE

ARTHUR B. COWDERY, OF NEEDHAM, MASSACHUSETTS, ASSIGNOR TO THE BARRETT COMPANY, A CORPORATION OF NEW JERSEY

PRODUCT AND PROCESS FOR RUBBER COMPOUNDING

No Drawing. Application filed November 22, 1924. Serial No. 751,687.

This invention relates to a product especially suitable for rubber compounding and to the process of making compounds containing rubber and this product.

In carrying out this invention a product is obtained as a residue by distilling coal tar in such a manner that a very large percentage of the volatile constituents are removed and the residue is not coked but contains in the neighborhood of 62% of uncombined or so-called free carbon probably in a colloidal state and extremely finely sub-divided and has a melting point of about 350° F. to 400° F. and a specific gravity of approximately 1.30 to 1.35, and is entirely free from oil and moisture. This sort of distillation may be carried out for example, by recirculating a neutral gas through the tar while it is being distilled and removing the volatile materials from the gas after it leaves the tar and before it re-enters the tar as described in U. S. Patent No. 1,418,893.

The product containing this very high percentage of carbon of the sort mentioned above or of material that is insoluble in benzol, and the remainder consisting for the most part of very high melting point hydrocarbons is finely ground or pulverized in any convenient manner until the particles will pass through a screen having 200 meshes to the inch.

These fine particles capable of passing through a 200 mesh screen and consisting of approximately 60 parts by weight of carbon of the sort mentioned above to about 40 parts of high melting point hydrocarbons are then mixed with rubber stock in the usual way by milling it and the rubber latex and other ingredients, if desired, between smooth rollers or any other suitable masticator or mixer. It has been found that this product mills more easily with the raw rubber than many other substances that have been used in compounding rubber and that it has less tendency to fly around in the air and contaminate other objects than lamp black, for example, has. It has been found that this product rapidly becomes very uniformly distributed through the mass. The improved results may possibly be due to the presence of the hydrocarbons which become plastic at elevated temperatures.

Heretofore lamp black or carbon has been produced for rubber compounding by burning natural gas, oils, or other hydrocarbons in an insufficient supply of air and permitting the products of combustion to impinge upon a cold surface from which the carbon may be subsequently removed. Such carbon is very fluffy and light and has a marked tendency to fly around in the air when disturbed. It is very different from the present product that does not result from cooling gaseous or light products of combustion. The present product is a residue left after distilling off volatile products from coal tar in such a manner as to give a product containing an exceedingly high percentage of uncombined carbon. The carbon seems to be a colloidal suspension in the remaining hydrocarbons of high melting point that are themselves quite brittle when cold. Many other carbons of the prior art stiffen the batches used for making rubber products to such a great extent that the practical quantity that can be used is limited. On the other hand the present product is a very soft carbon and greater quantities can safely be used. Again, in many stocks, other well known carbon blacks are not permissible on account of their great pigment power or exceedingly great blackening tendency while the carbon of this invention has very much less pigment strength and can be used, for example, in appreciable quantities, say up to 15% by weight, in the manufacture of tan colored heels and soles without producing too much discoloration.

As a specific example illustrative of this invention, I may start with a coal tar containing a large amount, say about one-fifth by weight, of uncombined carbon or matter insoluble in hot benzol and toluol and distill the same for several hours, the distillation being accompanied by the recirculation of a neutral gas such as carbon dioxide, for example, until about 60 to 70% by weight of volatile matter has been removed so that the residue will contain approximately 60% by weight of matter insoluble in hot benzol or toluol and the remainder being for the most part high boiling hydrocarbon compounds. This residue is withdrawn and permitted to cool whereupon it becomes a very brittle product. It can then be ground or pulverized to a very fine state and the particles which are fine enough to pass through a 200 mesh screen are to be used in rubber compounding. This finely ground material is mixed with the rubber stock together with other fillers, if desired, and incorporated therein in the regular manner after which the mixture is vulcanized.

The term "uncombined carbon" as used in the specification and claims refers particularly, as hereinbefore indicated, to material insoluble in benzol, the amount of which present in the coal tar residue may be determined for example by the method set forth on pages 736 and 820 (test D5) vol. 10 (1918) of the Journal of Industrial & Engineering Chemistry.

I claim:

1. In the process of compounding with rubber, the step which comprises mixing rubber stock and a coal tar distillation residue containing about 60% of uncombined carbon.

2. In the process of compounding with rubber, the step which comprises mixing rubber stock and a coal tar distillation residue containing about 60% of uncombined carbon and 40% of high boiling hydrocarbons.

3. A composition comprising rubber compounded with uncombined carbon and high melting point hydrocarbons, said carbon and said hydrocarbons being in the proportion of about 3 to 2.

4. A composition comprising rubber compounded with a coal tar residue containing uncombined carbon and high melting point hydrocarbons, said carbon and said hydrocarbons being in the proportion of about 3 to 2.

5. A composition comprising rubber compounded with a coal tar residue containing about 60% of uncombined carbon and about 40% of high melting point hydrocarbons, said residue being incorporated with said rubber in the form of particles small enough to pass through a 200 mesh screen.

6. A composition comprising rubber compounded with a coal tar residue containing about 60% uncombined carbon and about 40% of high melting point hydrocarbons, said residue being present in amounts not exceeding about 15%.

7. A composition comprising rubber compounded with a coal tar residue comprising about 60% uncombined carbon and about 40% of high melting point hydrocarbons, said rubber being in excess of said coal tar residue.

8. A composition comprising rubber compounded with a coal tar residue containing uncombined carbon disseminated in high melting point hydrocarbons, said residue being obtainable by a coal tar distillation involving the circulation of an inert gas through the tar and having a specific gravity of approximately 1.30 to 1.35 and being substantially free from oil and moisture.

9. A composition comprising rubber compounded with a coal tar residue containing about 60% of benzol-insoluble material and about 40% of high melting point hydrocarbons.

10. A composition comprising rubber compounded with a coal tar residue having a melting point above 350° F. and containing about 60% benzol-insoluble material and about 40% high melting point hydrocarbons.

11. A composition comprising rubber compounded with a coal tar residue having a melting point above 350° F.

In testimony whereof I affix my signature.

ARTHUR B. COWDERY.